United States Patent [19]

Lanteri

[11] Patent Number: 4,880,275
[45] Date of Patent: Nov. 14, 1989

[54] COMBINATION HEADREST AND WALL WITH SLIDING WINDOW

[76] Inventor: Michael A. Lanteri, 39 Wayhill Rd., W., Waterford, Conn. 06385

[21] Appl. No.: 120,715

[22] Filed: Nov. 6, 1987

Related U.S. Application Data

[63] Continuation-in-part of Ser. No. 928,823, Nov. 10, 1986, abandoned.

[51] Int. Cl.$^4$ .............................................. A47C 1/10
[52] U.S. Cl. ................................... 297/391; 297/395; 211/87
[58] Field of Search ............... 297/391, 395, 397, 400, 297/410, 284; 248/118; 211/64, 607

[56] References Cited

U.S. PATENT DOCUMENTS

| | | | |
|---|---|---|---|
| 195,842 | 10/1877 | Peckham | 297/395 |
| 3,366,417 | 1/1968 | Belk | 297/410 X |
| 3,369,786 | 2/1968 | Schloemer | 297/397 X |
| 3,393,938 | 7/1968 | Meyer et al. | 297/397 |
| 3,578,383 | 5/1971 | Earl | 297/391 |
| 3,851,919 | 12/1974 | Nagy | 297/395 |
| 3,876,079 | 4/1975 | Elkins et al. | 211/64 |
| 3,931,893 | 1/1976 | Elkins et al. | 211/87 X |
| 4,015,542 | 4/1977 | Gutridge et al. | 297/395 X |
| 4,058,221 | 11/1977 | Elkins et al. | 211/64 X |
| 4,206,945 | 6/1980 | Kifferstein | 297/397 X |
| 4,274,673 | 6/1981 | Kifferstein | 297/391 X |
| 4,341,422 | 7/1982 | Cunningham | 297/391 X |
| 4,447,922 | 5/1984 | Brochu | 297/391 X |
| 4,565,405 | 1/1986 | Mayer | 297/391 X |
| 4,607,886 | 8/1986 | Mazhar | 297/395 X |

Primary Examiner—Kenneth J. Dorner
Assistant Examiner—José V. Chen
Attorney, Agent, or Firm—Richard A. Craig

[57] ABSTRACT

A cushion useful a headrest in a vehicle comprising an elastic, foamed and resilient cushion body having a contoured face portion and a flat back portion wherein at least the face portion is covered by a finished surface and wherein the back portion carries a pressure sensitive, moisture activatable or heat activatable adhesive suitably protected by a removable coverstrip.

2 Claims, 3 Drawing Sheets

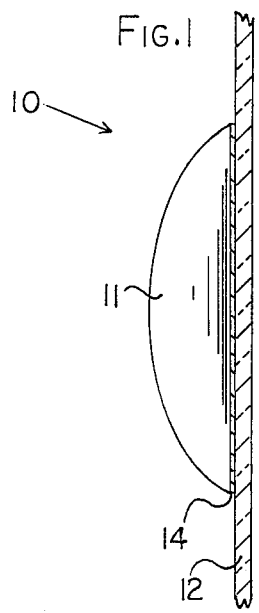
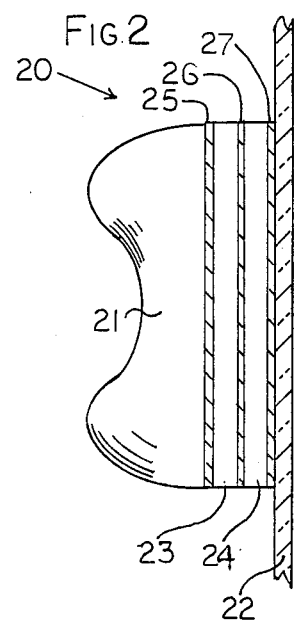
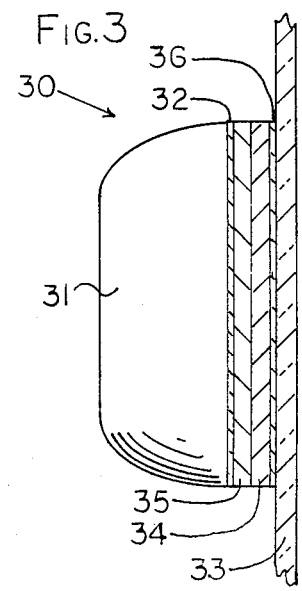
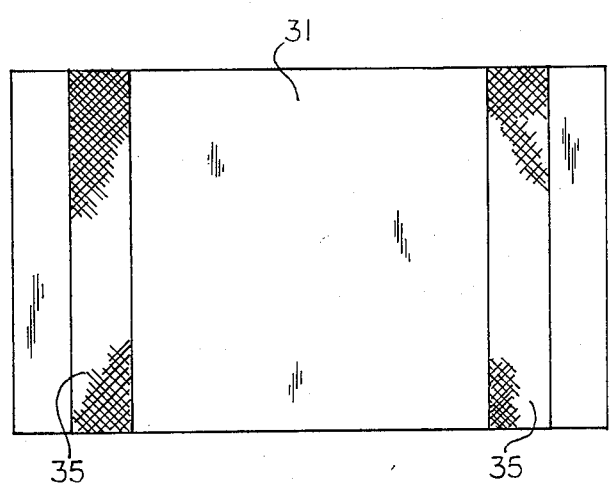
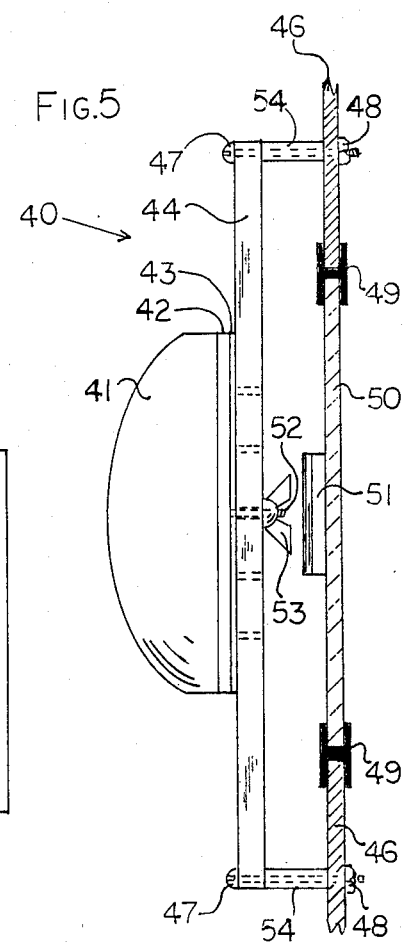

COMBINATION HEADREST AND WALL WITH SLIDING WINDOW

This is a Continuation-In-Part of patent application Ser. No. 928,823 filed Nov. 10, 1986, now abandoned.

DESCRIPTION OF THE INVENTION

This invention deals with a headrest pad useful for protecting head and neck of driver and/or passenger(s) against injury; the headrest pad is especially suitable for mounting to the inside of cab rear wall or window of trucks, station wagons and the like.

BACKGROUND OF THE INVENTION

Automobiles are routinely equipped with headrests typically mounted to the backs of front and back seats, however, in many trucks including so-called pickup trucks and back doors of station wagons such head protection is missing creating a possible hazard to the occupant(s) of such vehicles especially in case of a rear end collision.

Certain references of interest are concerned with headrests of one sort or another, yet, none is found to fulfill the above indicated need adequately, efficiently and effectively as does the means of this instant invention.

U.S. Pat. No. 4,607,886 (Mazhar) teaches a headrest having a specifically contoured cushion and a back plate attachable to the rear wall of a truck cab. Portion of the back plate rests against the back window of the cab and it is stated that supporting the headrest against the rear window of the truck is viewed as a significant innovation in the art. There is no mention of the cushion carrying adhesive means as taught by the instant invention.

U.S. Pat. No. 4,206,945 (Kifferstein) discloses a removable disposable head and back sheet comprising a sheet of soft, pliable material provided with a strip of Velcro (trademark) material suitable for attaching to said sheet a cushion. The cushion does not carry any adhesive and it would be contrary to the teaching and intent of this reference to permanently fasten the cushion to said sheet or the sheet to the back of a, for instance, bus seat.

U.S. Pat. No. 3,220,770 (Schaeffer) discloses a removable automobile headrest for use in combination with a window. The headrest comprises a pillow portion and a tab portion that is adapted to be held between the top edge of the window glass and the automobile frame when the window is closed. No permanent attachment is disclosed or contemplated nor are any adhesive means employed.

U.S. Pat. No. 3,601,445 (Glynias) teaches a headrest structure that is releasably attachable to a vehicular window by suction cups. The structure projects from the window, and a support structure is provided to support the headrest at various angles relative to the window.

U.S. Pat. No. 3,851,919 (Nagy) discloses a temporary headrest including a bracket that hooks over the top edge of a vehicular window.

U.S. Pat. No. 3,393,938 (Meyer et al) deals with a headrest including a curved pillow adjustably attached to a curved, U-shaped bracket designed to be placed over the top and front surfaces of a bus or truck seat.

The above references do not provide a headrest having the effectiveness, simplicity and versatility of the headrest of this invention nor, it is believed, is there any item of commerce available for the above indicated purpose.

SUMMARY OF THE INVENTION

It is, therefore, an object of this invention to provide a cushion useful as a headrest mountable against the front, i.e. the inside of a truck cab rear window or wall;

It is another object of this invention to provide a cushion that is attachable essentially permanently to a surface such as said cab rear window or wall;

It is a further object of this invention to provide a cushion which is translucent in order to maintain rear window visibility;

It is still another object of this invention to provide improved safety for drivers and passengers of trucks including pickup trucks;

It is still a further object of this invention to provide a truck having a headrest attached to the inside of its cab rear window or wall;

It is still another object of this invention to provide means for attaching such headrest to the rear wall of a truck cab without limiting the use of the cab's rear window;

Other objects of this invention will become apparent by the following description and claims.

BRIEF DESCRIPTION OF DRAWINGS

FIG. 1 is an elevated side view of a headrest of this invention mounted against a surface such as a back window pane;

FIG. 2 is an elevated side view of a headrest plus several expansion cushions attached to a back window;

FIG. 3 is an elevated side view of another headrest of this invention affixed to a back window;

FIG. 4 is a top plan view of a support plate carrying certain textile material useful for attaching a headrest of this invention thereon;

FIG. 5 is an elevated side view of alternate means for attaching headrest;

PREFERRED EMBODIMENTS OF THE INVENTION

Figure 6:
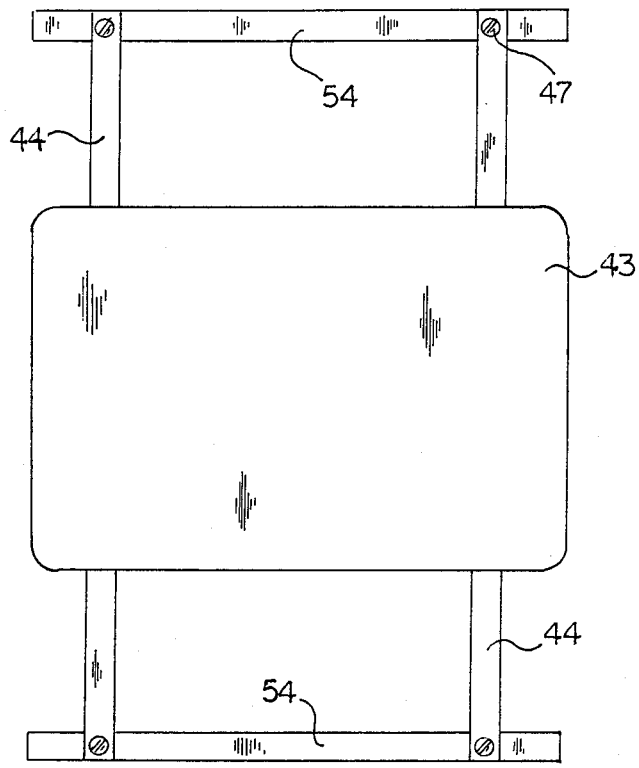
FIG. 6 is an elevated front view of FIG. 5.

Although it is mandatory in this country as well as in many other countries that passenger vehicles carry headrests for the protection of driver and passenger(s) against head injuries especially in cases of rear end collision, very rarely are such headrests found on trucks, pickup trucks, rear doors of station wagons or industrial vehicles. In many instances, there is relatively little space between driver seat or bench and the rear wall or rear window of the cabin portion of a truck, and this holds true for practically all kinds of trucks such as pickups, panel trucks, platform trucks, stake trucks, tractors for tractor-trailer combinations and the like, or industrial vehicles such as forklift trucks, back hoes and the like.

The invention fulfills the need for improved safety for people riding in truck type vehicles and accomplishes it in a simple yet most effective manner.

In FIG. 1 an headrest assembly 10 of this invention is shown, i.e. headrest 11 is fastened onto rear wall or rear window 12 of a truck (not shown) by means of an adhesive layer 14.

FIG. 2 indicates headrest an assembly 20 of this invention including contoured headrest 21 which is attached to a first extension cushion 23 by adhesive layer 25, said first extension cushion 23 in turn being fastened to a second extension cushion 24 by adhesive layer 26, the second extension cushion is mounted against the inside of a truck cab rear window 22 by adhesive layer 27. The extension cushions indicated above provide means for adjusting headrest location, i.e. they help bridging the distance between rear window or wall and the back of occupants of cab seats while also increasing total effective thickness of the headrest assembly.

A further embodiment of this invention is demonstrated in FIG. 3. In headrest assembly 30, headrest 31 is attached to the rear window or wall 33 of a truck (not shown) by a hook and loop type fabric fastener device which comprises a base member 34 fastened onto the window or wall 33 by suitable adhesive means 36, said base member 34 being a strip of woven fabric hooks, whereas the loops of the complementary member 35 (which is attached to headrest 31 by means of adhesive layer 32) allows the hooks of the base member 34 to fasteningly engage with the loops of the complementary member 35 when brought into contact with each other, keeping headrest 31 attached to window or wall 33.

FIG. 4 indicates back of headrest 31 with a possible arrangement of strips of complementary members 35 adhered thereto; although there are certain advantages to the hook and loop type adhering means, such as, the headrest can be removed and refastened if desired, or the position of the headrest may be adjusted, however, it is believed that for the purpose of safety it is preferred to have the headrest cushion essentially permanently attached to the desired location.

Since the cab rear windows of many truck like vehicles are constructed so that it is possible to slideably open them, an alternate headrest assembly 40 is illustrated in FIG. 5; wherein headrest cushion 41 is adhesively attached to support cover 42 which in turn is adhered to support plate 43, the latter being movably and adjustably mounted to support bars 44 (only one shown) by means of wingnut 53 tightened onto threaded post 52 of support plate 43; support bar 44 is fastened onto rear wall 46 of the vehicle cab by bolt 47 and nut 48, said bolt 47 penetrating support bar 44, spacer bar 54 and back wall 48, said spacer bar 54 provides enough room for operating back window 50 (including handle 51) which is slideably mounted within the cab rear wall 50 by rubber seals 49.

A partial front view of the headrest mounting assembly of FIG. 5 is provided in FIG. 6 indicating support plate 43 placed on support bars 44, the latter being transversely connected at their upper and lower extremities by spacer bars 54. It is important that spacer bars 54 provided space sufficient so that the headrest arrangement does not interfere with the operation of the window(s).

Figure 7:
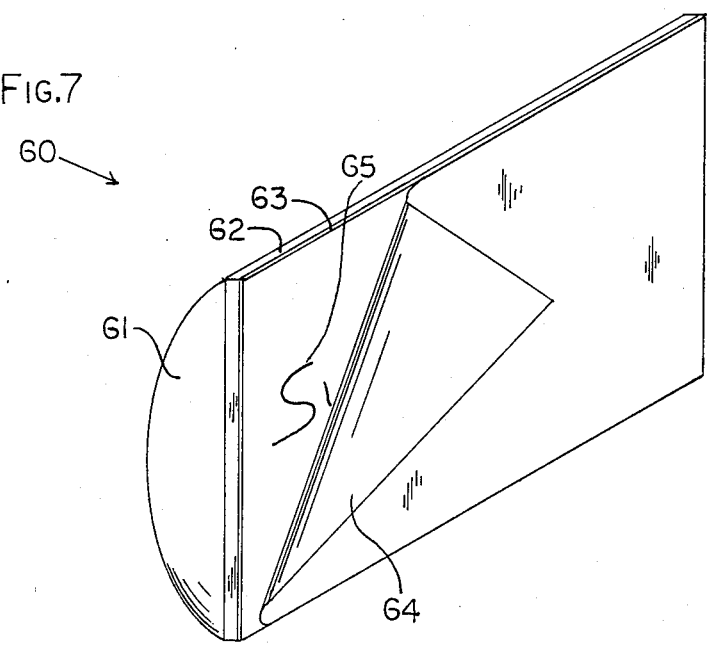
FIG. 7 is an elevated perspective view of a cushion of this invention.

FIG. 7 provides an illustration of a possible assembly including of a headrest 60 of this invention comprising cushion portion 61 adhered to support cover 62 which carries a pressure sensitive, heat activatable or moisture (i.e. water) activatable adhesive layer 63 protected by coverstrip 64 (partially peeled off); said support cover 62 may optionally carry a design such as writing 65 or ornament as partially indicated and visible when attached to rear window; in order to fasten the headrest 60, coverstrip 64 may be fully removed and then the headrest 60 is pressed against the surface of the desired location.

Although the support cover 42 provides added strength or stiffness to the headrest of this invention, it is not considered essential, and it is envisioned that in some applications a cushion without such support cover is quite adequate i.e. wherein the flat back portion carries adhesive means in the absence of a support cover.

Figure 8:
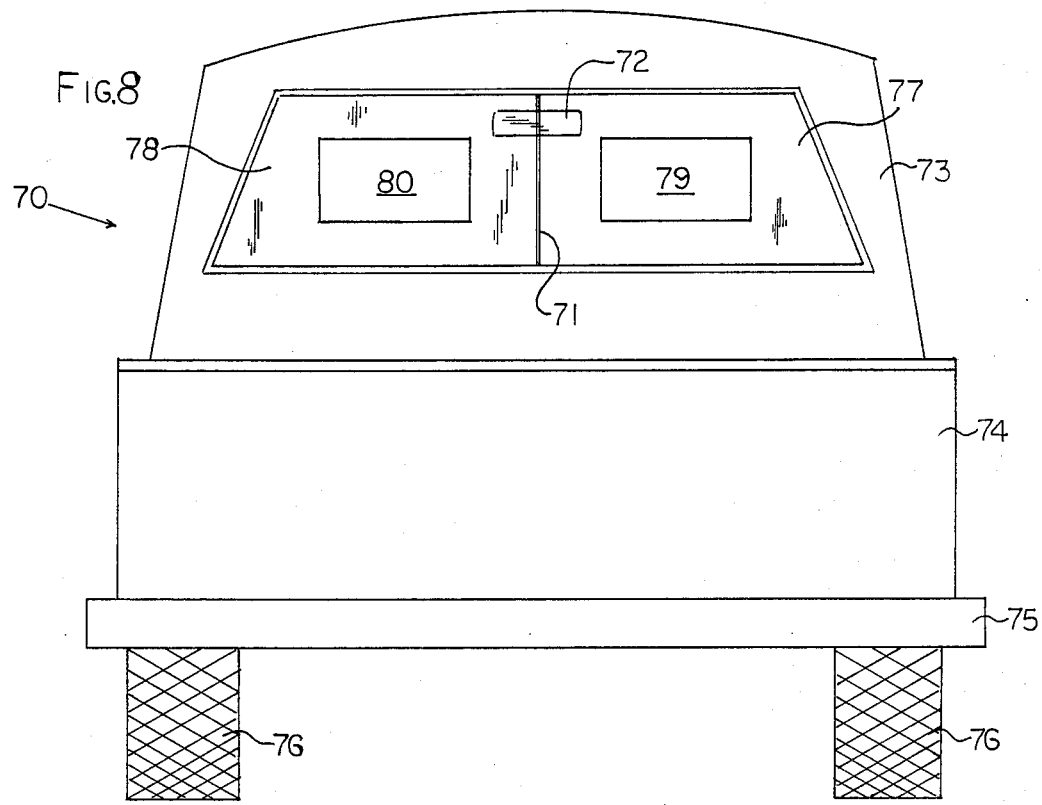
FIG. 8 is an elevated back view of a pickup truck having attached to the rear window of the cab headrests of this invention.

FIG. 8 represents the rear view of a schematically drawn pickup truck 70, having cab 73, rear end of cargo box 74, rear bumper 75 and rear wheels 76; right rear window 77 and left rear window 78, both separated by divider 71; right and left headrests 79 and 80 are attached to right and left rear windows, respectively, with the field of vision from rear view mirror 72 remaining essentially unobstructed.

Figure 9:
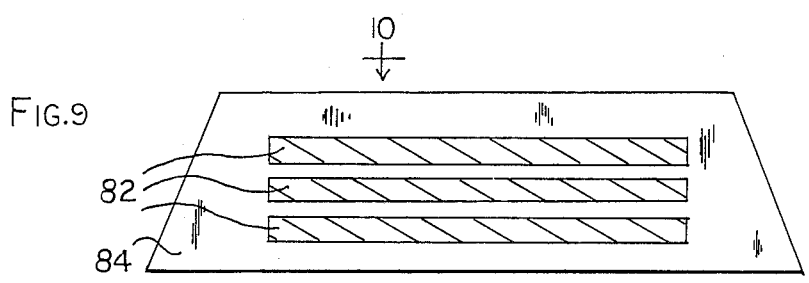
FIGS. 9, 11 and 13 are elevated front view of various headrests of this invention mounted against a truck window.
Figure 10:
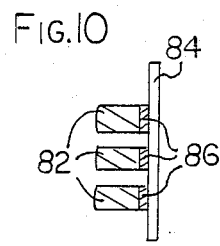
FIG. 10, 12 and 14 are elevated cross sectional views of FIG. 9, 11 and 13, respectively.
Figure 11:
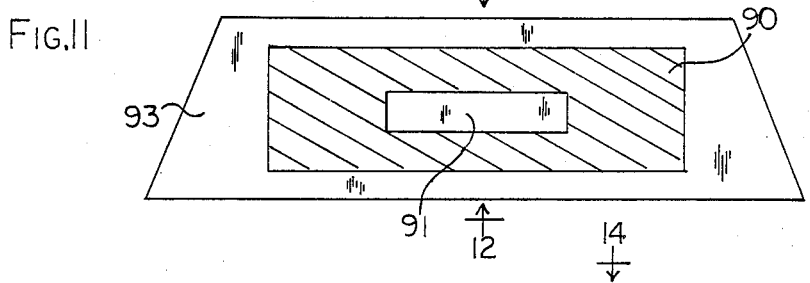
Figure 12:
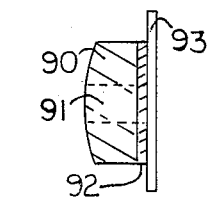
Figure 13:
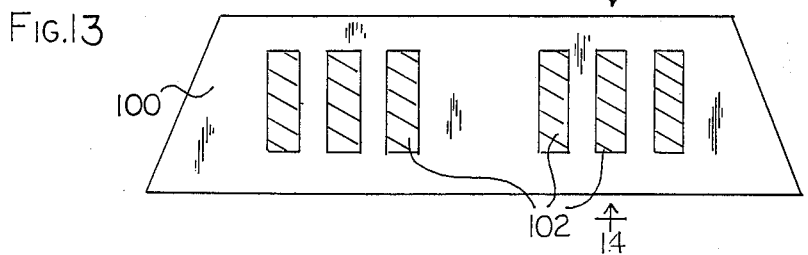
Figure 14:
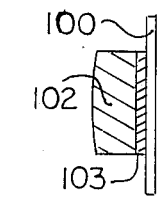

FIGS. 9 and 10 deal with an alternate headrest means in accordance with this invention wherein on a rear truck cab window 84 there is mounted in a spaced, horizontal and parallel fashion a plurality of elongatedly shaped headrest cushions 82, each carrying optional support cover 86 between headrest cushions 82 and window pane 84;

Another embodiment of this invention is demonstrated in FIGS. 11 and 12, wherein the headrest 90 is fastened onto window 93 but is equipped with a cushion free area 91, the latter area also being left free of optional support cover 92;

Still another embodiment of this invention is provided it FIG. 13 and 14 showing a plurality of elongated cushions 102 mounted vertically in a spaced fashion on the back window of a truck cab; cushions also are each reinforced by optional support covers 103 (only one shown in FIG. 14).

The main objective of the headrest assemblies illustrated in FIG. 9 through 14 is to demonstrate how possible view obstructive effects of the headrest of this invention can be greatly diminished without essentially reducing the safety benefits thereof, it being understood that above cushions 82, 90 and 102 may be adhesively bonded to the surface without respective support covers 86, 92 and 103.

The materials of construction of the headrest i.e. for the cushion portion and extension cushions of a headrest assembly, where applicable, may be any shock absorbing material, e.g. (self-skinned) polyurethane elastic foam, foamed rubbery materials such as derived from foamed or frothed natural rubber or synthetic elastomers of polybutadienes, poly(butadienestyrene), polyisoprene, poly(ethylene-propylene-nonconjugated diene), polychloroprene, chlorinated or chlorosulfinated polyethylene and the like or mixtures thereof, whether open celled or, preferably, closed celled, with or without a finished surface for at least the face portion such as based on woven or nonwoven fabric or a skin-type layer made from leather, poly(vinyl chloride), polyethylene, polypropylene, polyamide, polyester, aramide and the like or mixtures thereof. In another embodiment of this invention the headrest cushion may comprise an essentially gas impermeable and clear envelope filled with a suitable gas such as air or nitrogen.

The support covers, if used, may be made from any suitable rigid or flexible material in order to lend strength to the cushion, such materials include wood, cardboard, polyethylene, polypropylene, polyamides and the like, or metal sheeting such as based on steel, aluminum, brass and the like.

Any pressure sensitive, water activatable or heat activatable adhesive may be employed for fastening essentially permanently a headrest of this invention onto the backwall or window of a truck or back door of a station wagon. Any of the above adhesive means or other suitable adhesive or glue may be used to permanently adhere the cushion portion of the headrest to the support cover.

As indicated in FIG. 8 there are placed against the back window of a pick-up truck two independent headrests; it will be understood that, depending on space available, e.g. whether the back of the truck cab is one uninterrupted wall or window, in which case one single headrest of appropriate length may be applied for the intended purpose. Thus, the length of the headrest may be 2–72 inch, the height may be 0.75–16 inch and the thickness may be 0.25–10 inch. Preferably the length is 3–48 inch, the height is 1–12 inch and the thickness is 0.5–6 inch.

As already indicated above, the cushion of this invention is very useful for headrest application such as in trucks and station wagons (especially in the latter if, for instance, children are occupying the cargo space) and possibly where the general protection of the human body or of fragile material is desired such as in truck cargo boxes, truck trailers.

Although there may be many non-substantial changes and/or variations of the cushion of this invention, such as shape, material, use, etc., it is believed that they fall well within the scope of the appended claims.

What is claimed is:

1. The combination of a headrest assembly means and a cab including a rear wall having therein a sliding window assembly of a predetermined vertical dimension and projecting a predetermined horizontal dimension forwardly of said wall, said headrest assembly including first and second support bars each having an upper end and a lower end and a longitudinal dimension greater than said predetermined vertical dimension, and first, second, third and fourth spacer means, each secured to and projecting forwardly of said wall and of a length greater than said predetermined horizontal dimension, said first, second, third and fourth spacer means secured to said upper end of said first support bar, said lower end of said first support bar, said upper end of said second support bar and said lower end of said second support bar, respectively, thus to allow unobstructed sliding movement of said window assembly.

2. The combination according to claim 1 wherein said headrest assembly further comprises a support plate secured to said support bars and a cushion secured to said support plate.

* * * * *